June 26, 1962 R. R. HAGER 3,040,534
COMPENSATING MEANS FOR MASTER CYLINDERS
Filed June 30, 1960 2 Sheets-Sheet 1

INVENTOR.
ROBERT R. HAGER
BY
William P. Hickey
ATTORNEY

June 26, 1962 R. R. HAGER 3,040,534
COMPENSATING MEANS FOR MASTER CYLINDERS
Filed June 30, 1960 2 Sheets-Sheet 2
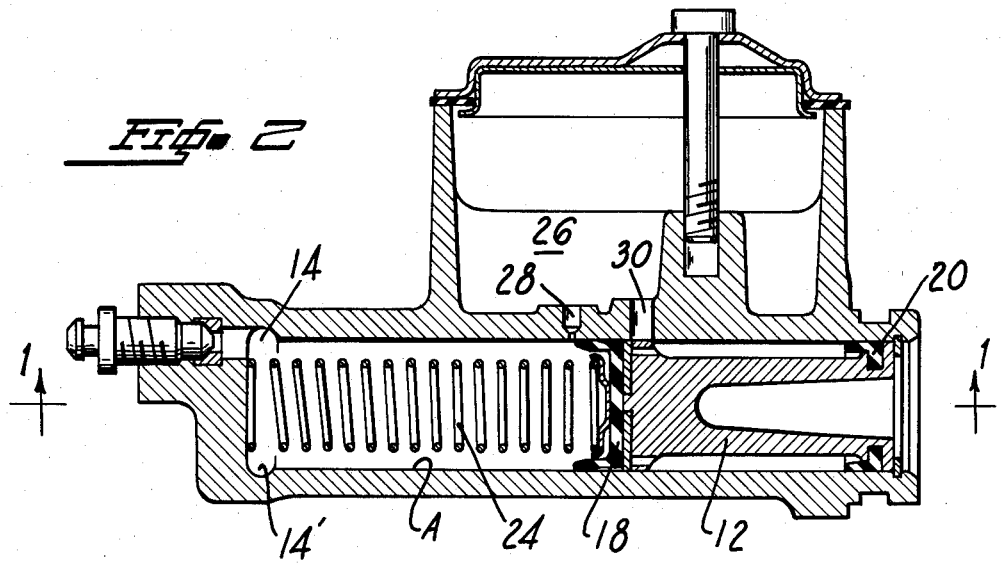
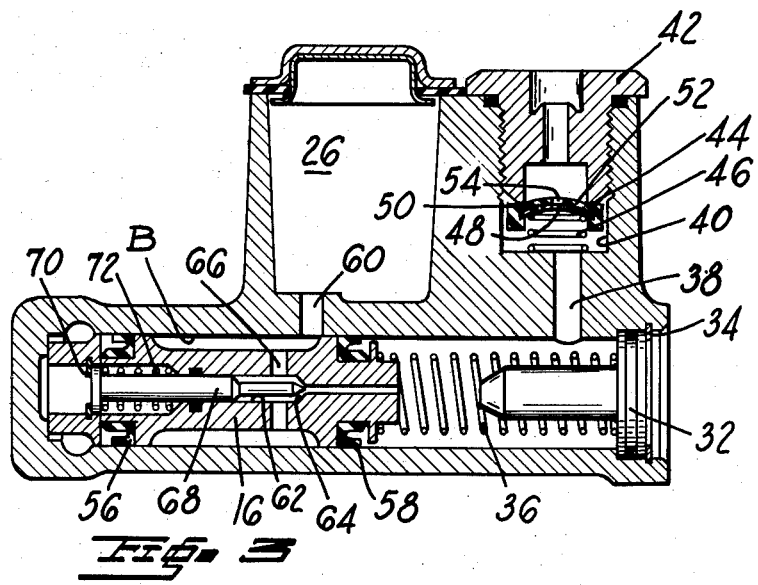
INVENTOR.
ROBERT R. HAGER
BY
William P. Hickey
ATTORNEY

# United States Patent Office 3,040,534
Patented June 26, 1962

3,040,534
COMPENSATING MEANS FOR MASTER
CYLINDERS
Robert R. Hager, Elkhart, Ind., assignor to The Bendix
Corporation, South Bend, Ind., a corporation of
Delaware
Filed June 30, 1960, Ser. No. 39,909
5 Claims. (Cl. 60—54.6)

The present invention relates to fluid pressurizing devices; and more particularly to the type of hydraulic master cylinder wherein the displacement of a first fluid displacement member is used to drive at least one other fluid displacement member.

An object of the present invention is the provision of a new and improved device of the above described type wherein fluid compensating means are provided for the output chamber of the second fluid displacement member, and wherein the fluid compensating means can be closed by a minimum of displacement from the first fluid displacement member.

Another object of the present invention is the provision of a new and improved master cylinder of the above described type wherein the second or secondary fluid displacement member is a piston having spaced apart seals between which is communicated a low pressure supply of compensating fluid, the piston further having a fluid compensating passageway which communicates the portion between the seals to its fluid displacement surface in the secondary bore, and the secondary piston further includes valve closure means for closing off the fluid compensating passage, which means is actuated by the displacement from the primary fluid displacement member.

Further objects and advantages of the invention will become apparent to those skilled in the art to which the invention relates from the following description of the preferred embodiments described with reference to the accompanying drawings forming a part of this specification, and in which:

FIGURE 2 is a vertical cross sectional view of the master cylinder shown in FIGURE 1 taken approximately along the line 2—2 of FIGURE 1;

FIGURE 3 is a vertical cross sectional view of the master cylinder shown in FIGURE 1 taken approximately on the line 3—3 of FIGURE 1.

Figure 1:
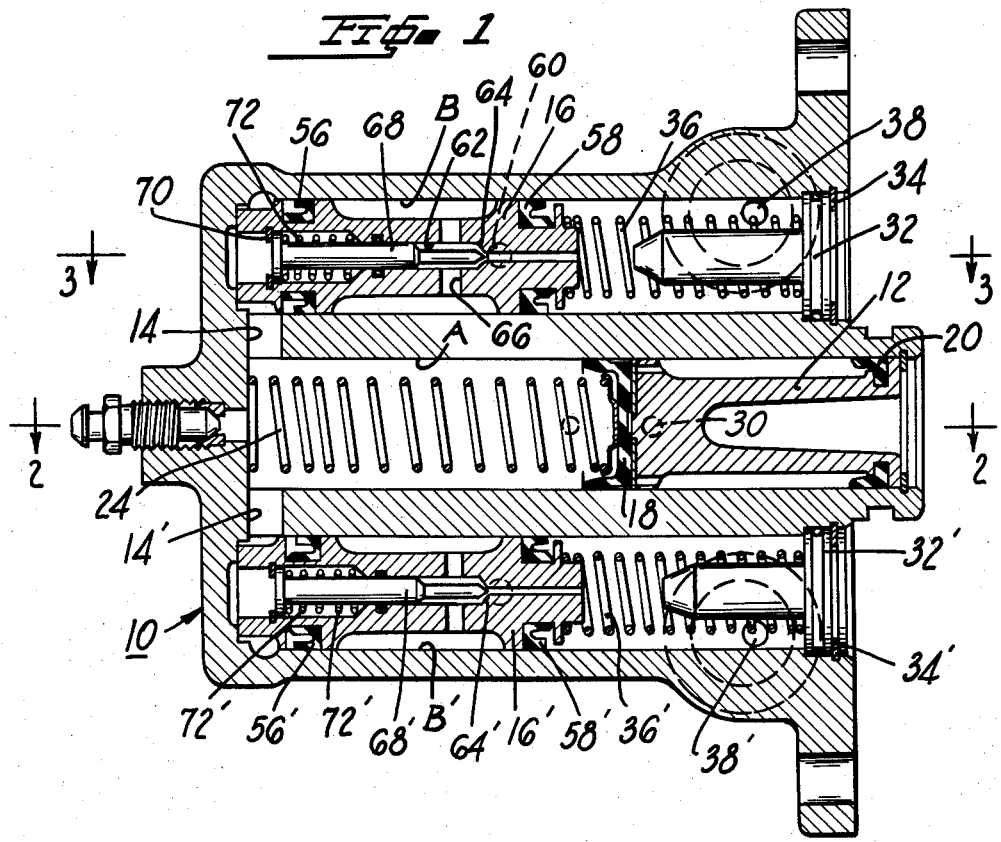
FIGURE 1 is a horizontal cross sectional view across a triple barrel master cylinder embodying principles of the present invention.

The hydraulic master cylinder shown in FIGURE 1 generally comprises a housing member 10 having a primary fluid displacement chamber or bore A and a pair of secondary fluid displacement chambers or bores B and B' which are positioned on opposite sides of the primary bore A. Hydraulic fluid in the primary bore A is adapted to be displaced therefrom by means of the primary fluid displacement member or piston 12; and the fluid displaced therefrom is conducted through lateral passageways 14 and 14' to the rear ends of the secondary bores B and B' respectively. Each of the secondary bores B and B' is in turn provided with a secondary fluid displacement member or piston 16 or 16' as the case may be; and inasmuch as the secondary bores and pistons are substantially identical, only one secondary fluid displacement bore and piston will be described in detail. Similar portions of the other secondary bore will be indicated by a like reference numeral characterized further in that a prime mark is affixed thereto.

The bores A, B, B' are positioned generally parallelly within the housing member 10, and each opens outwardly of the right hand end of the housing as seen in FIGURE 1. The piston 12 in the primary bore A is a generally spool-shaped member having a cup type seal 18 on its inner end and an annular lip seal 20 adjacent its outer end. An annular snap ring 22 is suitably seated in the sidewalls of the bore A adjacent its outer end, and the piston 12 is normally held thereagainst by means of the piston return spring 24. The hydraulic reservoir 26 is formed in the housing member 10 over the top of the bores A, B, and B'; and fluid from this reservoir is communicated to the portions of the bore A inwardly and outwardly of the normal position of the cup seal 18 by means of the compensating port 28 and flow opening 30. When the piston 12 is moved inwardly in the bore A from the normal position shown in the drawing, the cup seal 18 slides over the compensating port 28 to seal it off and thereafter generates pressure in the inner end of the bore A.

The secondary bore B is closed off by means of a closure member 32 which is suitably sealed with respect to the sidewalls of the outer end of the bore B, and which is held in place by means of a snap ring 34. The secondary piston 16 is normally held in engagement with the inner end of the secondary bore B by means of a piston return spring 36; and a hydraulic output port 38 is provided in the bore B adjacent the sealed end of the closure member 32. The upper end of the outlet port 38 is enlarged as at 40 to receive a threaded outlet connection 42; and a residual pressure check valve structure 44 is biased against the end of the outlet connection 42 by means of a coil spring 46, all in the usual manner, to hold a residual pressure in the system that is connected to the outlet connection or fitting 42. The residual pressure check valve structure 44 is formed by means of a dished plate 48 having a plurality of openings 50 therein that are located off center, and a rubber part 52 which is placed over the outer face of the plate 48 and is held in place by thickened peripheral edges which are snapped over the outer edge of the plate 48. A central opening 54 is provided in the rubber part 52 so that fluid from the secondary bore B can pass through the openings 50 in plate 48 and thence out through the opening 54 in rubber part 52.

Fluid pressure from the primary bore A is transmitted to the inner end of the secondary bore B by means of the transverse passage 14 and thereby drives the secondary piston 16 forwardly or towards the outer end of the bore B to displace fluid out through the outlet connection 42. During normal operation of the unit, a need for replenishment of fluid in the output end of the secondary bore B usually occurs by reason either of thermal expansion of the system connected to the outlet connection 42 or leakage in the system that is connected to the outlet connection 42. It is the usual practice of systems of the type corresponding to structures so far described to provide a compensating port between the reservoir 26 and the front end of the secondary piston 16 similar to that previously described for the primary piston 12. The disadvantage of such prior art systems is that a considerable movement of the primary piston 12 is required to first close its compensating port 28 and thereafter move the secondary piston 16 so that it thereafter closes off its compensating port.

According to principles of the present invention compensating means are provided for the output chamber of the secondary bore B which requires a minimum of displacement from the primary fluid displacement member 12 in order to close off the compensating means of the secondary chamber during the initial stage of the actuation of the unit. The embodiment of the invention shown in the drawing utilizes a secondary piston 16 having oppositely facing seals 56 and 58 which are spaced apart to provide a sliding seal between the sidewalls of the bore B and piston 16 to provide an intermediate space or chamber to which fluid from the reservoir 26 is communicated by means of passageway 60. The seals 56 and 58 may be located in the sidewalls of the secondary bore B, but in the preferred embodiment shown in the drawing, are fixed to opposite ends of the secondary piston 16. The piston 16 is provided with a longitudinal drilling extending between its front and rear end faces and is counterbored adjacent its rear end face to provide a shoulder or valve seat 64. The portion of the longitudinal opening 62 rearwardly of the valve seat 64 is communicated to the reservoir 26 by transverse passage 66; and flow communication from the reservoir 26 to the output side of the secondary bore B is controlled by means of a valve closure member 68 having a sliding seal rearwardly of the transverse passage 66. The valve closure member 68 is retained within the opening 62 by means of a snap ring 70, and a suitable spring 72 is provided to normally bias the closure member 68 into engagement with the snap ring 70, in which position the closure member is out of engagement with the valve seat 64.

In the normal condition of the master cylinder shown in FIGURES 1, 2 and 3 of the drawings, the structure will be in the condition best seen in FIGURE 1. Movement of the primary piston 12 inwardly of the bore A causes the seal 18 to close off the compensating port 28, whereupon fluid pressure is generated in the inner end of the bore A and transmitted to the inner end of the secondary pistons B and B' through the passages 14 and 14', respectively. Inasmuch as the springs 72 and 72' are relatively light springs as compared with the piston return springs 36 and 36,' the pistons 16 and 16' remain stationary while the valve closure members 68 and 68' are moved forwardly by the slight amount that is required to close the compensating ports 64 and 64'. Thereafter a further increase in pressure in the primary bore A holds the valve closure members 68 and 68' firmly in engagement with their valve seats 64 and 64' respectively and moves the secondary pistons 16 and 16' down their respective bores to displace fluid out of the outlet ports 38 and 38'. Fluid flows through the outlet ports 38 and 38' through the respective openings 50 and 50' in the plates 48 and 48', respectively; and thence through the openings 54 and 54' to the respective braking systems that are connected thereto. A release of pressure on the primary piston 12 permits the pressure that has been generated into the systems that are connected to the outlet connections 42 and 42' to move the structures 40 and 40' out of engagement with the respective outlet connections 42 and 42' and thereby return into the outer ends of the respective bores B and B'. The pressure in the outlet ends of the bores B and B' as well as the piston return springs 36 and 36' forces the pistons 16 and 16' rearwardly in their bores to cause the fluid that is trapped in their inner ends to move the primary piston 12 outwardly in its bore A. Just before piston 12 reaches the position shown in the drawing, its cup seal 18 uncovers the compensating port 28 to release pressure in the inner end of the bore A thereby permitting the springs 72 and 72' to move the valve closure members 68 and 68' with their respective valve seats 64 and 64'. Fluid from the reservoir 26 is thereby permitted to flow into the annular space between the seals 56 and 56' and 58 and 58' respectively, as the case may be, thence through the lateral passages 66 and 66' past the valve seats 64 and 64' to the outer or forward ends of the secondary bores B and B'.

Figure 4:
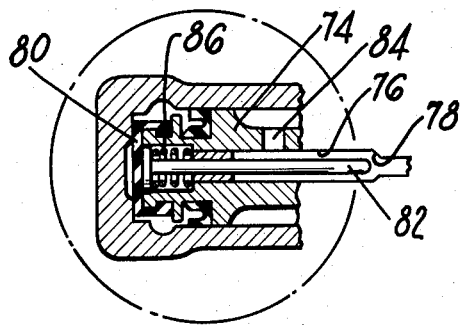
FIGURE 4 is a fragmentary cross sectional view of another embodiment of valve closure member which can be used in the hydraulic input end of the fluid displacement members.

It will be apparent that the invention is not limited to the precise structure so far described and that other structure can be used to accomplish the desired function and result. One such structure can be seen in FIGURE 4 of the drawings showing the inner or rear face of a secondary piston 74 having structure which can be used to replace that in either of the pistons 16 or 16'. Secondary piston 74 is provided with a longitudinal passage 76 having a valve seat 78 therein very similar to that of the embodiment shown in FIGURE 1; and the embodiment shown in FIGURE 4 differs principally from that seen in FIGIURE 1 in that pressure from the primary piston 12 is delivered against a diaphragm 80 which is carried on the rear face of the secondary piston 74, and the diaphragm 80 in turn is abutted by the head of the valve closure member 82 to force it into engagement with its valve seat 78. The secondary piston 74 is also provided with a lateral passage 84 corresponding to the passage 66 in the previously described embodiment; so that it communicates the reservoir 26 with the front face of the secondary piston 74 in the same manner as that described for the embodiment seen in FIGURES 1, 2 and 3. A coil spring 86 similar to the coil spring 72 is provided to normally hold the valve closure member 82 out of engagement with the valve seat 78. Operation of the embodiment shown in FIGURE 4 is substantially identical to that described for the embodiments seen in FIGURES 1, 2 and 3 excepting that the pressure from the primary piston 12 is delivered against diaphragm 80 instead of against the head of the valve closure member 82 directly.

It will be seen that the objects heretofore enumerated have been accomplished; and that there has been provided a multi-piston master cylinder having primary and secondary fluid displacement members in which compensation across the secondary member is achieved with a minimum of displacement of the primary fluid displacement member.

While the invention has been described in considerable detail, I do not wish to be limited to the particular embodiments shown and described; and it is my intention to cover hereby all adaptations, modifications and arrangements thereof which come within the practice of those skilled in the art to which the invention relates.

I claim:

1. In a hydraulic master cylinder and the like: a housing having first and second fluid displacement chambers, first and second fluid displacement members for respective first and second fluid displacement chambers, said second fluid displacement member being moved forwardly in its chamber by the fluid displacement of said first fluid displacement member, and said second fluid displacement member having spaced apart sealing means, said housing having a reservoir of compensating fluid communicating with the portion of said second displacement member intermediate said sealing means and said second fluid displacement member having a compensating passage communicating said portion intermediate said sealing means and its forward fluid pressurizing surface, said passage having a valve seat therein, and a movable valve member actuated by the fluid pressure of said first fluid displacement member for closing off said valve seat, whereby the initial displacement of said first fluid displacement member closes off said compensating port before moving said second fluid displacement member.

2. In a hydraulic master cylinder and the like: a housing having first and second fluid displacement chambers, first and second fluid displacement members for respective first and second fluid displacement chambers, said second fluid displacement member being moved forwardly in its chamber by the fluid displacement of said first fluid displacement member, spaced apart seals between said second fluid displacement member and the sidewalls of said second fluid displacement chamber, said housing having a reservoir of compensating fluid communicating with the portion of said second displacement member intermediate said sealing means and said second fluid displacement member having a compensating passage communicating said portion intermediate said sealing means and its forward fluid pressurizing surface, and means subject to the pressure in said first fluid pressure chamber for closing said compensating passage, whereby the initial displacement of said first fluid displacement member closes off said compensating port before moving said second fluid displacement member.

3. In a hydraulic master cylinder and the like: a housing having first and second fluid displacement chambers, a first fluid displacement member for said first chamber, a fluid displacement piston for said second fluid displacement chamber, said piston having a front face for displacing fluid from said second fluid displacement chamber and a rear face subject to the pressure of said first fluid displacement chamber, spaced apart seals between the sidewalls of said second chamber and said piston, said housing having a reservoir of compensating fluid communicating with the sidewalls of said second chamber intermediate said spaced apart seals, said piston having a fluid compensating passage communicating the sidewalls of said second chamber between said seals and the front displacement surface of said piston in said second chamber, and means subject to the pressure in said first fluid pressure chamber for closing said fluid compensating passage.

4. In a hydraulic master cylinder and the like: a housing having first and second fluid displacement chambers, a first fluid displacement member for said first chamber, a fluid displacement piston for said second fluid displacement chamber, said piston having a front face for displacing fluid from said second fluid displacement chamber and a rear face subject to the pressure of said first fluid displacement chamber, spaced apart seals between the sidewalls of said second chamber and said piston, said housing having a reservoir of compensating fluid communicating with the sidewalls of said second chamber intermediate said spaced apart seals, said piston having a fluid compensating opening between its front and rear faces, said opening having a valve seat facing the rear face of said piston, a side passage communicating the portion of said chamber intermediate said seals with the portion of said fluid compensating opening between said rear face of said piston and said valve seat, and a valve closure member in said opening subject to the pressure of said first chamber for closing said valve seat.

5. In a hydraulic master cylinder and the like: a housing having a primary bore and a pair of secondary bores, a primary piston in said primary bore and a pair of secondary pistons having front and rear end faces in respective secondary bores, means communicating the displacement from said primary piston to the rear end faces of said secondary pistons, said secondary pistons having spaced apart seals slidingly engaging the sidewalls of their respective secondary bores, said housing having a reservoir communicating with the sidewalls of said secondary bores intermediate said spaced apart seals of each secondary piston, each secondary piston having a longitudinal opening extending between its front and rear face and a valve seat in each opening facing its rear face, each secondary piston also having a branch opening communicating the portion of the secondary bore intermediate its seals with the portion of said longitudinal opening between said valve seat and its rear face, and a movable valve closure member in each longitudinal opening subject to the displacement of said primary piston for closing off its valve seat, whereby the initial displacement of said first piston closes off said compensating ports before moving said secondary pistons.

References Cited in the file of this patent
UNITED STATES PATENTS

| | | |
|---|---|---|
| 2,560,105 | Hart | July 10, 1951 |
| 2,608,063 | White | Aug. 26, 1952 |
| 2,649,692 | Stelzer | Aug. 25, 1953 |
| 2,762,199 | Major | Sept. 11, 1956 |
| 2,916,884 | Bricker et al. | Dec. 15, 1959 |